(12) United States Patent
Banister et al.

(10) Patent No.: US 7,454,181 B2
(45) Date of Patent: Nov. 18, 2008

(54) MULTI-ANTENNA RECEIVE DIVERSITY CONTROL IN WIRELESS COMMUNICATIONS

(75) Inventors: Brian C. Banister, San Diego, CA (US);
Fatih Ulupinar, San Diego, CA (US);
Gregory A. Breit, San Diego, CA (US);
Edward G. Tiedemann, Jr., Concord, MA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 11/073,049

(22) Filed: Mar. 4, 2005

(65) Prior Publication Data

US 2005/0197079 A1 Sep. 8, 2005

Related U.S. Application Data

(60) Provisional application No. 60/583,902, filed on Jun. 28, 2004, provisional application No. 60/550,756, filed on Mar. 5, 2004.

(51) Int. Cl.
*H04B 1/06* (2006.01)
(52) U.S. Cl. ............... 455/133; 455/277.1; 455/277.2; 455/278.1; 455/303; 455/273; 375/349; 375/347
(58) Field of Classification Search ............... 455/135, 455/132, 424, 425, 561, 456.5, 456.6, 67.11, 455/506, 63.1, 65, 67.13, 101, 522, 13.4, 455/272, 273, 277.1, 277.2, 278.1, 115.1, 455/115.4, 562.1, 133, 575.1, 550.1, 303; 375/148, 150, 342, 130, 147, 347, 260, 335, 375/267, 207, 349, 350, 340; 370/342, 335, 370/312, 334, 400, 145, 148, 144
See application file for complete search history.

(56) References Cited

U.S. PATENT DOCUMENTS

| | | | |
|---|---|---|---|
| 5,566,364 A | 10/1996 | Mizoguchi et al. | |
| 5,737,327 A * | 4/1998 | Ling et al. | 370/335 |
| 5,812,542 A * | 9/1998 | Bruckert et al. | 370/335 |
| 5,903,554 A * | 5/1999 | Saints | 370/342 |
| 5,926,503 A * | 7/1999 | Kelton et al. | 375/148 |
| 5,999,826 A * | 12/1999 | Whinnett | 455/561 |
| 6,009,310 A | 12/1999 | Motohashi | |
| 6,449,290 B1 | 9/2002 | Willars et al. | |
| 6,560,300 B2 * | 5/2003 | Mesecher | 375/347 |
| 6,587,696 B1 * | 7/2003 | Ma et al. | 455/522 |
| 6,690,944 B1 * | 2/2004 | Lee et al. | 455/522 |
| 6,816,709 B2 * | 11/2004 | Dickey | 455/67.16 |
| 6,839,379 B1 * | 1/2005 | Horng et al. | 375/148 |
| 6,888,877 B2 * | 5/2005 | Doetsch et al. | 375/147 |

(Continued)

FOREIGN PATENT DOCUMENTS

DE 4403612 8/1995

(Continued)

*Primary Examiner*—Edward F. Urban
*Assistant Examiner*—Charles Chow
(74) *Attorney, Agent, or Firm*—Kenneth K. Vu; Kenyon S. Jenckes; Thomas R. Rouse (57) ABSTRACT

A mobile device comprises a receiver unit that has at least two receivers to implement multi-antenna receive diversity. A control unit estimates, at the mobile, an amount of utilization by a traffic channel of the mobile of total transmission power capacity at a base station. The mobile applies multi-antenna receive diversity in the mobile device based on the power capacity utilization. The mobile estimates an amount of power a network is transmitting to the mobile relative to a pilot reference. Other indicators are based on quality of the traffic channel between the mobile and the network, capacity limiting resources, a number of sectors in a soft hand-off in a wireless system, etc. The indicators are used to control application of multi-antenna receive diversity in a mobile device.

60 Claims, 7 Drawing Sheets

U.S. PATENT DOCUMENTS

| | | |
|---|---|---|
| 6,917,820 B2 | 7/2005 | Gore et al. |
| 6,931,050 B1 * | 8/2005 | Bottomley ................ 375/130 |
| 6,947,475 B2 * | 9/2005 | Sendonaris et al. ........ 375/148 |
| 6,965,788 B1 * | 11/2005 | Barratt et al. ............... 455/574 |
| 7,190,874 B1 | 3/2007 | Barth et al. |
| 2002/0105962 A1 | 8/2002 | Bolgiano et al. |
| 2004/0137930 A1 * | 7/2004 | Kim et al. .................. 455/517 |
| 2004/0253955 A1 * | 12/2004 | Love et al. ................. 455/442 |
| 2005/0037718 A1 | 2/2005 | Kim et al. |
| 2005/0130597 A1 * | 6/2005 | Li et al. ..................... 455/67.11 |
| 2005/0191978 A1 * | 9/2005 | Spencer et al. ............. 455/132 |
| 2005/0197080 A1 * | 9/2005 | Ulupinar et al. ............. 455/135 |
| 2006/0002321 A1 * | 1/2006 | Han et al. ................... 370/312 |
| 2006/0009168 A1 | 1/2006 | Khan et al. |
| 2006/0023775 A1 * | 2/2006 | Rimini et al. ............... 375/150 |
| 2006/0056357 A1 * | 3/2006 | Payne et al. ................. 370/334 |
| 2006/0098759 A1 * | 5/2006 | Tiedemann et al. ......... 375/297 |

FOREIGN PATENT DOCUMENTS

| | | |
|---|---|---|
| GB | 2347591 | 9/2000 |
| WO | 01059945 | 8/2001 |
| WO | 03030403 | 4/2003 |

* cited by examiner

MULTI-ANTENNA RECEIVE DIVERSITY CONTROL IN WIRELESS COMMUNICATIONS

CLAIM OF PRIORITY UNDER 35 U.S.C. §119

The present Application for Patent claims priority to Provisional Application No. 60/550,756 entitled "METHOD AND APPARATUS FOR RECEIVER DIVERSITY CONTROL IN WIRELESS COMMUNICATIONS" filed Mar. 5, 2004, and to Provisional Application No. 60/583,902 entitled "METHOD AND APPARATUS FOR RECEIVER DIVERSITY CONTROL IN WIRELESS COMMUNICATIONS" filed Jun. 28, 2004, assigned to the assignee hereof and hereby expressly incorporated by reference herein.

BACKGROUND

1. Field

The present invention relates generally to wireless communications and more specifically to multi-antenna receive diversity in a wireless communication system.

2. Background

Mobile multi-antenna receive diversity refers to the use of multiple receivers in a wireless communications device. A different antenna provides input to each individual receiver, thereby providing diversity to the communications link. The diversity improves call and data transmission quality and also increases the network capacity. The multiple antennas provide spatial diversity as each multipath appears differently at each antenna. Therefore, the effects of multipath fading are not strongly correlated among the receivers. The outputs of the multiple receiver chains are combined in order to provide a better estimation of the symbols prior to decoding. Combination methods known in the art include, but are not limited to, Minimum Mean Squared Error (MMSE) combining, maximal-ratio combining, equal-gain combining, and selection combining. The main drawback of mobile receive diversity is that each receiver chain expends power, particularly in the Radio Frequency (RF) and analog portions of the chain.

Studies have shown multi-antenna receive diversity increases the forward link capacity significantly. The capacity increase may be capitalized as higher throughput, lower base station transmit power, lower Frame Error Rate (FER), or a combination of thereof. One drawback of multi-antenna receive diversity is the power cost of implementing and operating such receivers. In addition, the benefits of multi-antenna receive diversity may not always be utilized or even needed.

There is a need, therefore, to control when receive diversity is used and when it is not used. There is a need in the art for control methods and apparatuses to use mobile diversity when the benefits of greater link capacity, higher throughput, lower transmit power, lower error rate, etc. are required, and not to use mobile diversity when the benefits do not justify the higher power cost. Furthermore, there is a need to control the diversity to optimize the tradeoff between multiple multi-antenna receive diversity and power consumption in a wireless communications device.

SUMMARY

A mobile device comprises a receiver unit that has at least two receivers to implement multi-antenna receive diversity. A control unit, coupled to control the receivers, estimates, at the mobile, an amount of utilization by a traffic channel of the mobile of total transmission power capacity at a base station. The mobile controls application of multi-antenna receive diversity in the mobile device based on the power capacity utilization. In one embodiment, the mobile estimates an amount of power a network is transmitting to the mobile relative to a reference, such as a pilot. In other embodiments, indicators, based on quality of the traffic channel between the mobile and the network, capacity limiting resources, a number of sectors in soft hand-off in a wireless system, etc., are used to control application of multi-antenna receive diversity in a mobile device.

DETAILED DESCRIPTION

Figure 1:
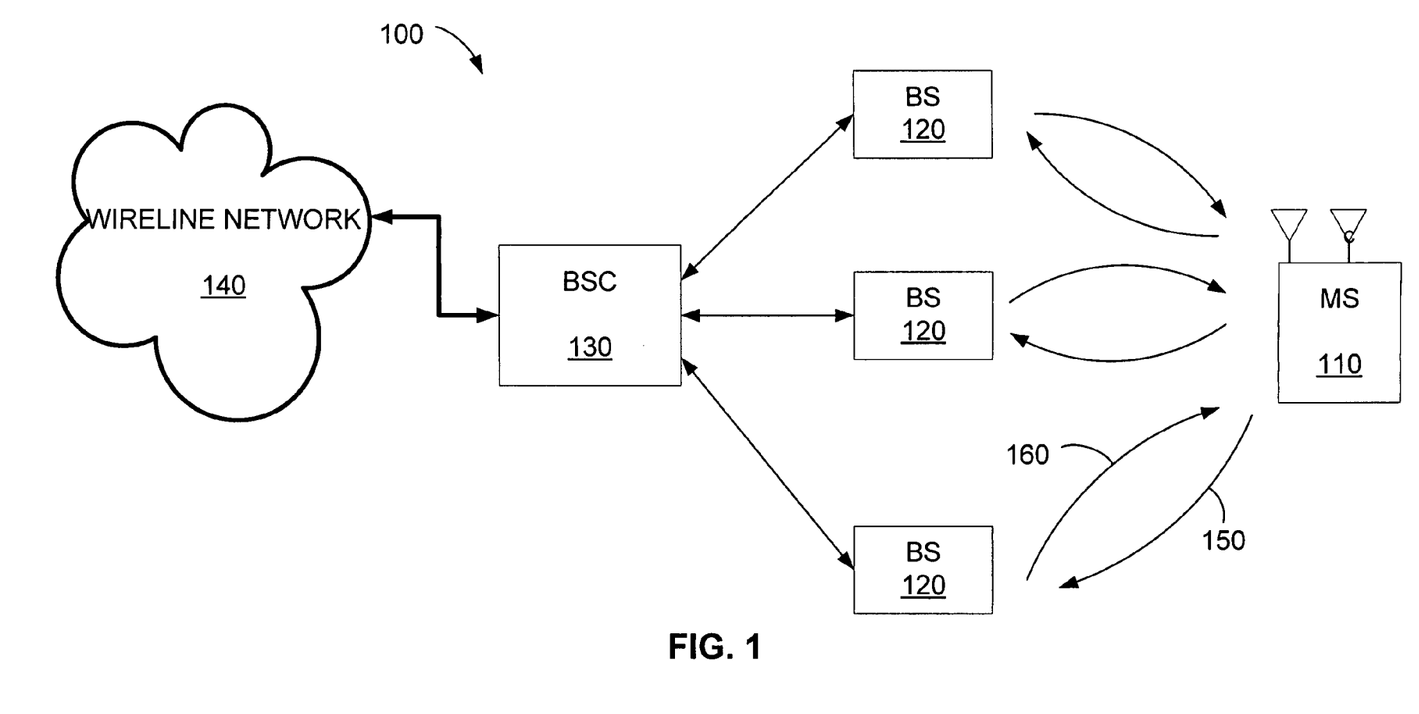
FIG. 1 is a wireless communications system in which multi-antenna receive diversity is used.

FIG. 1 is an example of a wireless communications network 100 in which multi-antenna receive diversity may be used. A Mobile Station (MS) 110, which may be mobile or stationary, may communicate with one or more Base Stations (BSs) 120. A mobile station 110, referred herein as "mobile," transmits and receives voice or data or both through one or more BSs 120 connected to a Base Station Controller (BSC) 130. BSs 120 and BSCs 130 are parts of a network called an Access Network (AN). BSC 130 connects to wireline network 140, which may include any of a variety of circuit technologies. The access network transports voice or data to and between BSs 120. The access network may be further connected to additional networks outside the access network, such as a wired telephone system, a corporate intranet, or the Internet which constitute parts of the Wireline Network 140. The access network may transport voice and data between each access mobile 110 and such outside networks. A mobile 110 that has established an active traffic channel connection with one or more base stations 120 is called an active mobile station, and is said to be in a traffic state. A mobile 110 that is in the process of establishing an active traffic channel connection with one or more base stations 120 is said to be in a connection setup state. The communication link through which the MS 110 sends signals to the BS 120 is called the Reverse Link (RL) 150. The communication link through which a Base Station sends signals to a mobile station is called the Forward Link (FL) 160.

Multi-antenna receive diversity may increase the forward link capacity of a wireless communications system significantly. While multi-antenna receive diversity incurs overhead costs, the operating environment of the wireless system may realize a benefit of multi-antenna receive diversity operation over simply operating a single receiver chain. To balance the goals of reduced power usage while taking advantage of the benefits of multi-antenna receive diversity in such environments, it is desirable to control multi-antenna receive diversity operation in a mobile 110. Multi-antenna receive diversity control would operate to turn off the diversity when it offers little benefit, and thereby save power, and turn on the diversity when it would be beneficial.

The presently described embodiments include methods and apparatuses for controlling the application of multi-antenna receive diversity for the purpose of power savings while retaining the benefits of diversity when needed. Multi-antenna receive diversity is controlled in response to operating conditions, transmission requirements, and user settings, among other criteria. The specific condition(s) to trigger a switch in diversity operation may depend on the standard specification(s) and protocol(s) under which the MS is operating as described herein.

The methods described herein for controlling MS multi-antenna receive diversity are applicable to any wireless communication system, using various multiple access schemes, such as, but not limited to, Code Division-Multiple Access (CDMA), Frequency Division-Multiple Access (FDMA), Orthogonal Frequency Division Multiplexing (OFDM) or Time Division-Multiple Access (TDMA). Examples of CDMA multiple access schemes include but are not limited to systems supporting standard protocols, such as TIA/EIA/IS-95, TIA/EIA/IS-2000 or cdma2000, 1xEV-DO, 1xEV-DV, and WCDMA. The embodiments described herein may be used in any wireless system having two or more operational receivers (i.e., one receiver plus one or more diversity receivers, in the mobile station for a given communication scheme).

Figure 2:
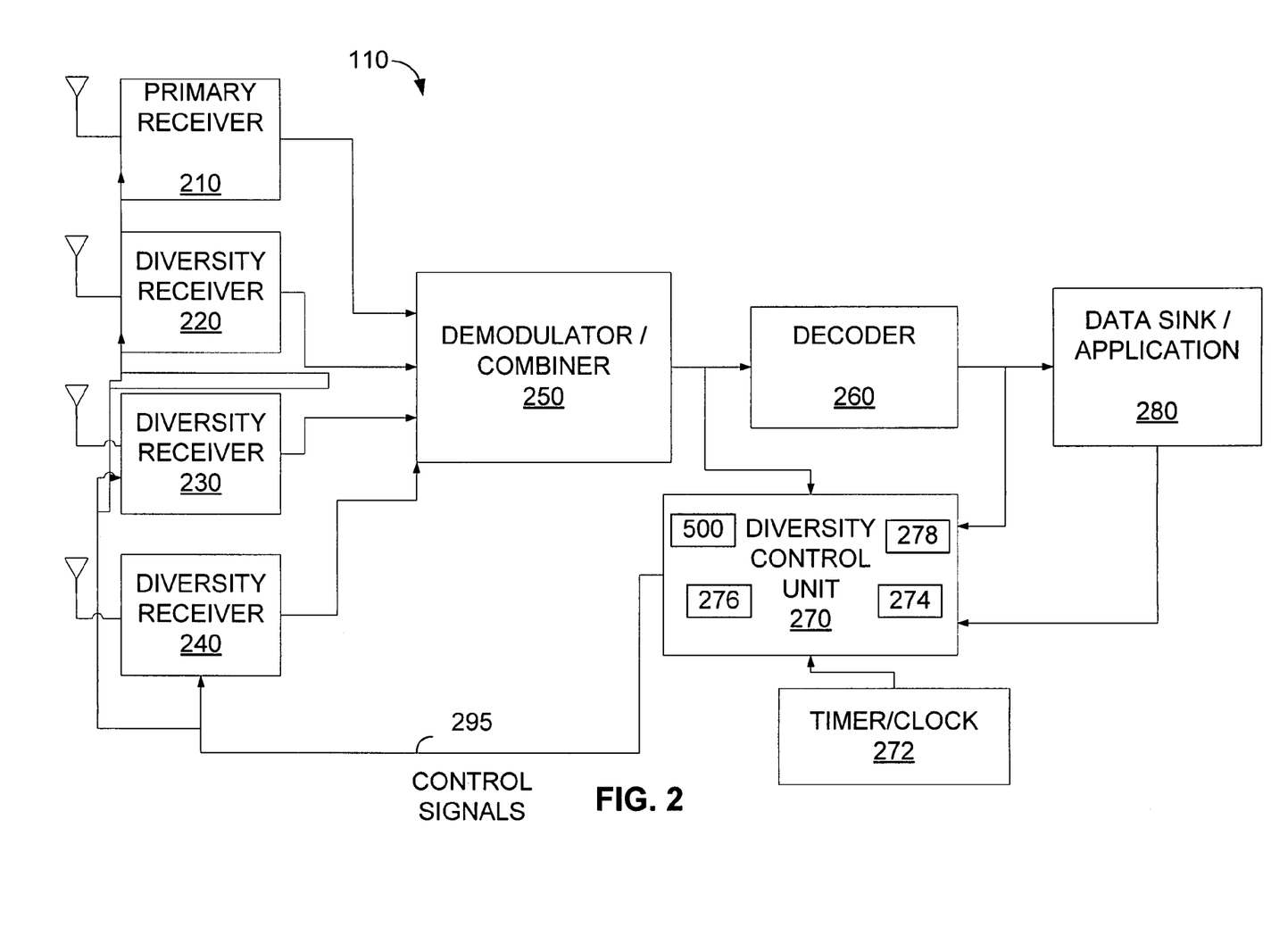
FIG. 2 is a mobile station that has multi-antenna receive diversity.

FIG. 2 is a diagram of a portion of the mobile 110 with two or more antennas and two or more receivers, as illustrated in FIG. 1. Where specific embodiments described herein are described with respect to a degree of diversity of two, (i.e., two antennas, two receivers, or two receiver chains), such embodiments are described for clarity and are not meant to preclude other degrees of diversity. The invention described herein applies to multi-antenna receive diversity with two or greater antennas, two or greater receivers, or two or greater receiver chains. In this disclosure the term "primary receiver" is used to indicate the main receiver chain, as well as portions of a receiver chain in use for receive operations, whether multi-antenna receive diversity is in use at the time or not. The term "diversity receiver" indicates an additional receiver, receiver chain, or portions of an additional receiver chain, which provide diversity when multi-antenna receive diversity is operational. Therefore, a communications device with a degree of diversity of two has one primary receiver plus one diversity receiver. Furthermore, the primary receiver, the diversity receiver chain, or portions of the diversity receiver chain may be integrated into a single chip, or distributed over multiple chips. Also, the primary receiver, the diversity receiver chain, or portions of the diversity receiver chain may be integrated into a chip along with other functions of the wireless device.

In one embodiment, illustrated in FIG. 2, primary receiver 210 and diversity receivers 220-240 provide input to Demodulator/Combiner 250. Primary receiver 210 may include the RF analog front end portions of the receiver, as well as other functions and operations, including RF processing, analog, demodulation, decoding, and other receiver tasks in any combination. demodulator/combiner 250 combines the outputs of primary receiver 210 and any or all of diversity receivers 220-240 and provides output symbols for decoder 260. Note, when multi-antenna receive diversity is disabled, primary receiver 210 continues to provide outputs to demodulator/combiner 250. Decoder 260 converts the symbols into bits. The bits are provided to the Data Sink/Application 280. Diversity control unit 270 receives indicators from the outputs of demodulator/combiner 250 or decoder 260 or both.

Diversity control unit 270 also receives other indicators that will be described below. Diversity control unit 270 as shown in the embodiment of FIG. 2 uses both symbols and bits to determine whether to turn multi-antenna receive diversity on or off. Further, diversity control unit 270 uses various other operating conditions and settings separately or in combination. Diversity control unit 270 outputs control signal(s) 295 to diversity receivers 220-240 to control their respective operation. Control signal(s) 295 may be single or multiple signals. Furthermore, control signal(s) 295 may be separate signals to each of diversity receivers 220-240, or may be common signals to all diversity receivers 220-240. Control signal(s) 295 may also be multiplexed, encoded, or formatted using various techniques known in the art.

In one embodiment, a timer or clock 272 may be used to implement a time period for diversity operation. The timer 272 may initiate when diversity control is enabled and remain on for a predetermined or dynamically determined time period, after which diversity control is disabled. Note, the timer may be implemented to track diversity control for optimization of the diversity control process. In such a way, the timer 272 would allow the diversity control unit 270 to store the diversity control scenarios of operation, allowing the diversity control unit 270 to predict future operation. For example, the timing information may allow the diversity control unit 270 to adjust the time period after which diversity is disabled.

In one embodiment, diversity control unit 270 includes a first estimator, referred to as a load on network capacity estimator 274, and a second estimator, referred to as a capacity usage estimator 276. The diversity control unit 270 further includes control means 278 which controls operation of at least one diversity receiver, such as diversity receivers 220, 230, 240 in response to the first and second estimators 274 and 276, respectively. One embodiment includes a loading estimator 500, detailed in FIG. 4. Estimator 500 provides an indication of the portion of capacity used by a given mobile station, in the context of the loading condition of the network. Such estimation is then used for making MRD control decisions.

Alternate embodiments may employ more or less estimators to estimate any of a variety of operational parameters, including, but not limited to, network and/or wireless apparatus (e.g. MS 10) parameters.

Figure 3:
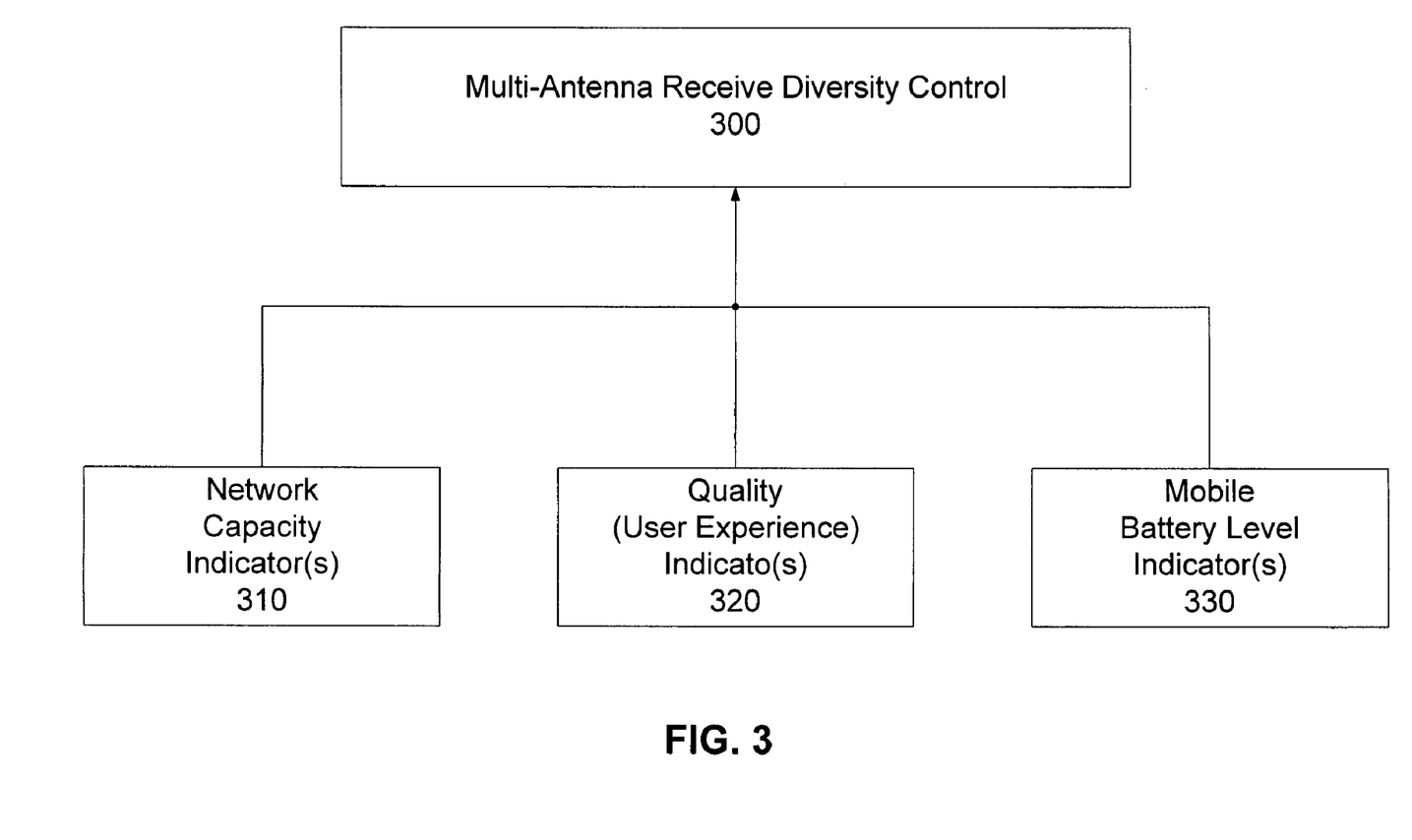
FIG. 3 is a high-level block diagram illustrating multi-antenna receive diversity considerations.

Overview of Multi-antenna Receive Diversity Considerations:

The techniques described herein use one or more indicators to determine whether to turn on or turn off multi-antenna receive diversity. FIG. 3 is a high-level block diagram illustrating multi-antenna receive diversity considerations. Multi-antenna receive diversity control 300 receives one or more indicators from network capacity indicator(s) 310, quality (e.g., user experience) indicators 320, and/or mobile battery level indicator(s) 330. In some embodiments, network capacity indicator(s) 310 are used to control application of multi-antenna receive diversity. In some embodiments, quality indicator(s) 320, also referred to as user experience, are used to control application of multi-antenna receive diversity. In some embodiments, other considerations, such as mobile battery level indicator(s) 330, are used. In yet other embodiments, various combinations of quality, network capacity, battery level in the mobile and other indicators may be used.

In general, in determining whether to apply multi-antenna receive diversity, two network capacity parameters are considered. One parameter identifies the total amount of resources allocated by the network, and a second parameter identifies the mobile's utilization of the network resources. If the network is not experiencing a high load on the network resources (e.g., transmission power), then the network has resources to allocate more power to the user. As a result, the system may decide to turn off multi-antenna receive diversity. As a second network capacity consideration, the mobile may turn on multi-antenna receive diversity if the mobile is using a large amount of available capacity. If the mobile is only using a small amount of the network's available capacity, then the system may decide to turn off multi-antenna receive diversity. In one embodiment of a wireless system, transmitting voice, both network resource load and mobile utilization of network resources are used to control multi-antenna receive diversity. Thus, if a mobile is using a large amount of network capacity, the system may benefit from application of multi-antenna receive diversity.

Network Capacity Indicators to Control Multi-antenna Receive Diversity:

In one embodiment, the mobile estimates the amount of load on the network resources. The estimate of load on network capacity may be expressed as:

$$\frac{I_{OR}}{E_{CP}}$$

wherein, $I_{or}$ represents the total transmitted energy per chip from a given base station for all channels transmitting from the base station, such as BS 120; wherein such total is a sum of energy from the pilot channel, all traffic channels, etc; and wherein $E_{cp}$ represents energy per chip of the pilot channel. The MS 110 also estimates capacity usage by the mobile. The estimation of capacity usage by the MS 110, i.e., the portion of transmitted power directed to a given mobile station, may be expressed as:

$$\frac{E_{CT}}{I_{OR}},$$

wherein, $I_{or}$, as above, represents the total transmitted energy per chip for all channels transmitting from the base station; and wherein $E_{CT}$ represents energy per chip of the traffic channel for a given mobile station. The To evaluate both the load on network capacity and capacity usage by the mobile, the mobile estimates:

$$Capacity_{Estimate} = \frac{I_{OR}}{E_{CP}}(dB) + \frac{E_{CT}}{I_{OR}}(dB).$$

In one embodiment, the mobile weights each of the estimates to obtain:

$$Capacity_{Estimate} = \alpha_1 \frac{I_{OR}}{E_{CP}}(dB) + \alpha_2 \frac{E_{CT}}{I_{OR}}(dB),$$

wherein, $\alpha_1$ represents the weight parameter for the estimate of load on network capacity, and $\alpha_2$ represents the weight parameter for capacity usage by the mobile. The formula is again shown in the decibel representation. Various metrics may be applied to generate the weight parameters, $\alpha_1$ and $\alpha_2$. The weight parameters may be adjusted in coordination with system design, priorities, and/or operation of the system. In one embodiment, both estimates are weighted equally (i.e., $\alpha_1 = \alpha_2$) to obtain:

$$Capacity_{Estimate} = \frac{E_{CT}}{E_{CP}}.$$

Figure 4:
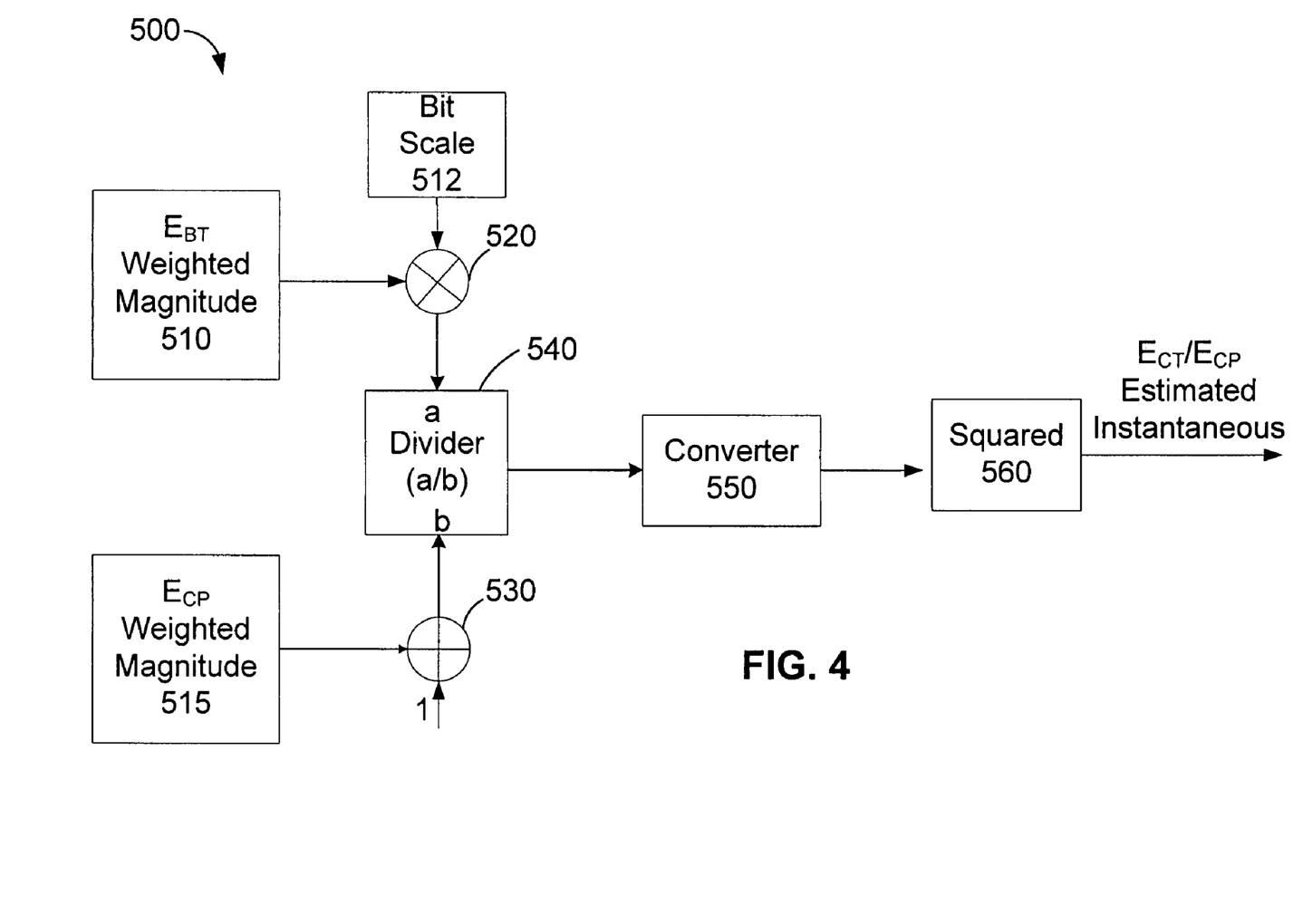
FIG. 4 is a block diagram illustrating one embodiment for estimating energy-of-traffic to energy-of-pilot ratio.

The estimation of traffic-to-pilot power ratio, i.e., estimation of $E_{CT}/E_{CP}$, is illustrated in FIG. 4, detailed hereinbelow. A large value of $I_{OR}/E_{CP}$ indicates a large network load, i.e., many mobile stations each with a traffic channel capacity $E_{CT}$ contributes to a larger $I_{OR}$; and a large value of $E_{CT}/I_{OR}$ indicates the given mobile is consuming a large portion of the capacity. There is a desire to use Multi-antenna Receive Diversity control mechanisms to enable diversity when the mobile station is consuming a large portion of capacity, i.e., $E_{CT}/I_{OR}$ is large, unless the network loading is light, i.e., $I_{OR}/E_{CP}$ is small, in which case it may not be a concern for a given mobile station to consume a large portion of capacity. As detailed with respect to FIG. 4, a convenient way to evaluate the loading conditions is to combine the metrics as follows:

$$\frac{E_{CT}}{E_{CP}} = \frac{E_{CT}}{I_{OR}} * \frac{I_{OR}}{E_{CP}}.$$

One embodiment incorporates an estimate of forward power utilization. In this embodiment, the mobile estimates a proportion of power allocated to a forward link data channel targeted to MS 110. The estimate of forward link power may be referenced to the total forward link power, which may consider only power allocated to the specific mobile station, such as MS 110 in the present example, or may include measures of power to other mobile stations. The power calculation may be referenced to a known reference signal. A diversity control algorithm may then turn on diversity when a metric exceeds a given threshold and turn off diversity when the metric falls below a given threshold.

In one embodiment, the system calculates an estimate of the ratio of energy-of-traffic to energy-of-pilot. The energy-of-traffic to energy-of-pilot ratio measures the power the network is transmitting to the mobile ($E_{CT}$) relative to a reference, the pilot ($E_{cp}$). In general, the energy-of-traffic to energy-of-pilot ratio estimates, at the mobile, the power the network is allocating to the mobile. In one embodiment, the energy energy-of-traffic to energy-of-pilot ratio is calculated based on estimates from Power Control Bits (PCBs). The traffic-to-pilot energy ratio, as measured from the power control forward link, may be expressed as:

$$\frac{E_{CT}}{E_{CP}}$$

wherein:
$E_{CT}$ is an estimate of the energy per chip for traffic for a given mobile station; and
$E_{CP}$ is an estimate of the energy per chip of the pilot channel.

In one embodiment, the traffic-to-pilot energy ratio is estimated from a power control subchannel on the forward link.

The power control bits are not buried in noise, and thus are suitable for this estimation. The power control bit magnitude is estimated by standard techniques (e.g., despread and accumulate in CDMA). In a system with 16 power control bits per traffic channel frame (e.g., cdma2000), the traffic-to-pilot energy ratio may be estimated as a summation as follows.

$$SumOfEstimates = \left[ \frac{\sum_{16} \sqrt{E_{CT}}}{\sum_{16} \sqrt{E_{CP}}} \right]^2$$

In one embodiment, samples from sixteen (16) power control bits are acquired every 20 milliseconds to acquire the sum of estimates.

FIG. 4 is a block diagram illustrating one embodiment of at least one estimator 500 included within diversity controller 270 of FIG. 2. The inputs to estimator 500 coming from demodulator/combiner 250. The estimator 500 for estimating energy-of-traffic to energy-of-pilot ratio. In one embodiment, the weighted pilot magnitude, extracted from a digital signal processor in the MS or mobile device, is used to estimate the energy-of-traffic to energy-of-pilot ratio. The weighted pilot magnitude is the mean magnitude, not energy, of the punctured forward power control subchannel. The weighted traffic bit magnitude, $E_{BT}$, is accumulated in register 510, and the weighted pilot magnitude, $E_{CP}$, is accumulated in register 515 every 20 ms frame. The weighted traffic bit magnitudes are rescaled to convert the Power Control Bit (PCB) magnitude to the equivalent Forward Control Channel (FCH), $E_{CT}$ magnitude. In other words, Bit Scale 512 converts the bit magnitude $E_{BT}$ to the same units as $E_{CT}$. The scaling accounts for the PCB length (e.g., 128 chips in cdma2000) and the ratio of the chip energies of the power control subchannel and the FCH. As shown in FIG. 4, the 16 bit integer, $E_{BT}$, is input to multiplier 520 for conversion to a 32 bit Q12 integer. The 16 bit integer, $E_{CP}$, is input to summer 530 with a one, so as to avoid division by zero when calculating the ratio. A magnitude ratio of the FCH to pilot is generated from the scaled values, in divider 540, and then converted to a 16 bit unsigned Q12 integer in block 550. This value is squared, in calculation unit 560, to produce the power ratio as a 32 bit unsigned Q24 integer. The 32 bit unsigned Q24 integer representation supports $E_{CT}/E_{CP}$ ratios from −72 dB to +24 dB. However, resolution may be degraded at the lower end of that range.

In another embodiment, the system calculates, as at least a partial indicator to decide whether to turn on or turn off multi-antenna receive diversity, another estimate of the energy-of-traffic to energy-of-pilot ratio. For this embodiment, the system estimates a ratio of energy-of-noise to energy-of-pilot. In one implementation, the estimate ratio of energy-of-noise to energy-of-pilot is multiplied by a constant, T_fixed. For this embodiment, the indicator may be expressed as:

$$\frac{N_T}{E_{CP}} \text{T\_fixed},$$

wherein, $N_T$ is an estimate of the received noise per chip; $E_{cp}$ is an estimate of the energy per chip for pilot; and T_fixed is a constant. The value, T_fixed, scales the ratio, and may comprise any predetermined constant. In one embodiment, T_fixed comprises a scale based on the data rate of the traffic channel. In one implementation, T_fixed is set to a value of $$\frac{1}{\# \, ofChipsperBit}.$$

Many wireless standards, such as cdma2000, use power control to modulate the transmit power of the mobile and base station in order to meet target performance criteria under varying operating conditions, while providing for increased network capacity. In another implementation to estimate a ratio of energy-of-noise to energy-of-pilot, the mobile calculates an estimate of the fast forward power control setpoint. For this embodiment, the indicator may be expressed as:

$$\frac{N_T}{E_{CP}} (\text{T\_adapt}),$$

wherein, T_adapt, estimated by $$\frac{E_b}{N_T},$$

represents the target value for the signal-to-noise ratio of the fast forward power control setpoint. In one embodiment, T_adapt is estimated from the power control outer loop for a particular FER. The outer loop power control setpoint is typically given as energy per bit per noise energy, Eb/No. The Eb/No provides a target at the receiver to meet the FER requirements. A larger value of the forward link power control setpoint indicates the mobile requires a higher Eb/No to achieve the target FER from the inner power control loop. The mobile may benefit from multi-antenna receive diversity in such cases because combining two or more receive chains reduces the amount of required Signal-to-Noise Ratio (SNR) at the receiver.

The scaled ratio of noise to pilot is an estimate, by the mobile, of traffic power the mobile calculates to receive from the network. Thus, the ratio of energy-of-noise to energy-of-pilot measures whether the mobile requires a small or a large portion of power from the network. If the mobile does not require a large portion of forward link power allocation from the network, the mobile may decide not to turn on multi-antenna receive diversity. Accordingly, the scaled ratio of energy-of-noise to energy-of-pilot may be used as an indicator to turn on or turn off multi-antenna receive diversity based on the assumption that the forward power control inner loop has converged.

Figure 5:
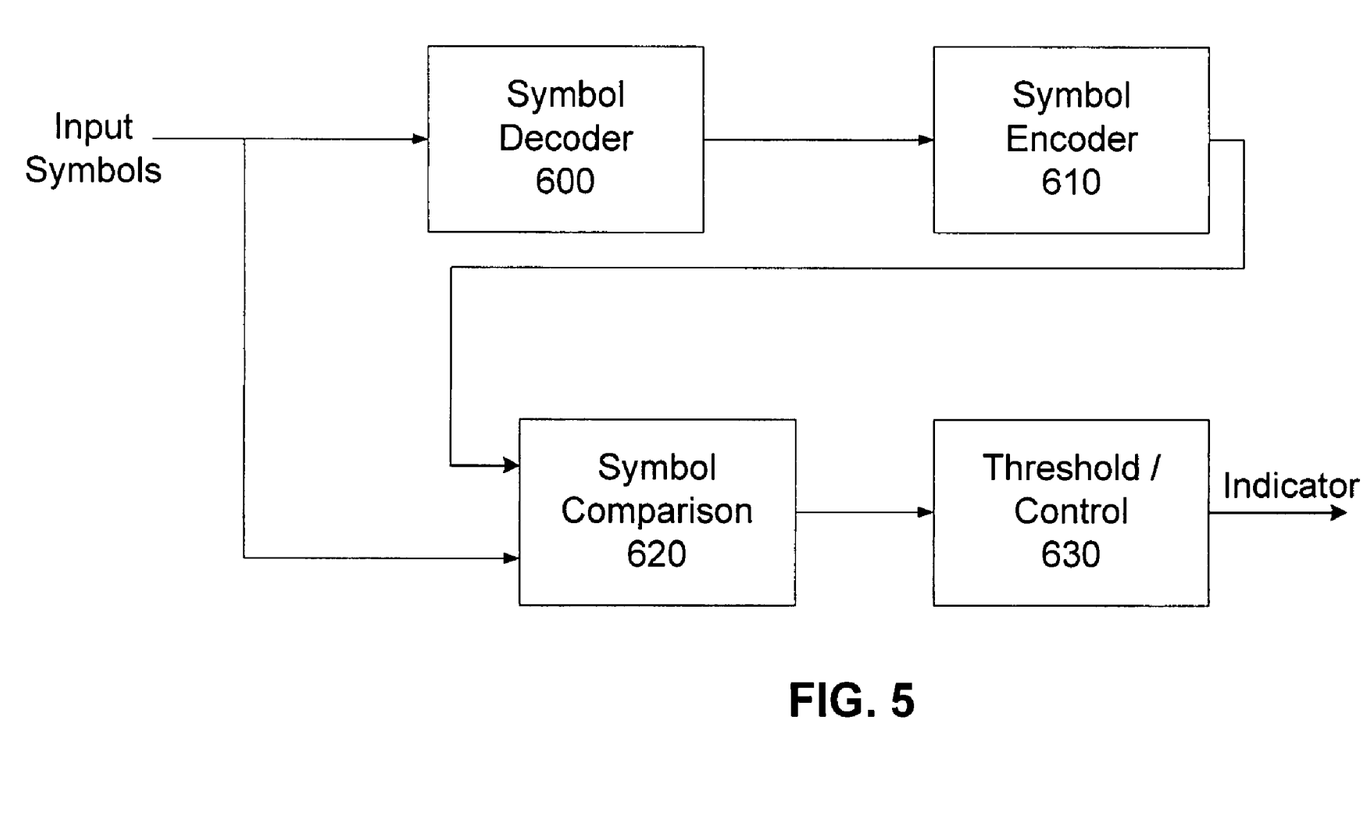
FIG. 5 is a block diagram illustrating generation of one energy metric used to control multi-antenna receive diversity.

In another embodiment, an additional energy metric is generated and analyzed to decide whether to turn on or turn off multi-antenna receive diversity. FIG. 5 is a block diagram illustrating generation of one energy metric used to control multi-antenna receive diversity. For this embodiment, a frame is decoded, and bits are extracted over a twenty (20) millisecond period. The bits are a digital representation of a sequence of input symbols. For the embodiment of FIG. 5, bits are decoded in symbol decoder 600. The bits are then re-coded into a frame by symbol decoder 610. The signal from the re-coded frame represents a signal absence of noise, assuming the frame was decoded properly. The re-coded bits are correlated with the original received symbols to provide an energy metric estimate in symbol comparison unit 620. The difference between the start and end signals is indicative of channel quality. For example, a large difference between the start and end signals signifies poor channel quality. Conversely, a small difference between the signals indicates good signal quality.

The symbol comparison yields an estimate of energy per symbol. The energy per symbol estimate is proportional to energy per chip, $E_{CT}$. The energy per symbol is weighted accordingly to generate an estimate for the energy per chip. A threshold is applied to the $E_{CT}$ estimate in order to generate at least a partial indicator to turn on or turn off multi-antenna receive diversity at threshold/control unit 630.

In one embodiment, blocks 600, 610, and 620 are configured within decoder 260 illustrated in FIG. 2. Alternate embodiments may configure such blocks alternately within the mobile station or mobile device to perform the same functions. In one embodiment, threshold/control 630 is configured within diversity control unit 270. Alternate embodiments may employ alternate configurations.

Soft Hand-off Sectors Indicator(s) for Multi-antenna Receive Diversity Control:

In another embodiment, the system measures the number of sectors in a soft hand-off as an indicator to decide whether to turn on or turn off multi-antenna receive diversity. In general, a greater number of sectors used in soft hand-off indicates a greater use of network resources. In turn, the amount of network resources allocated to the mobile may be used to decide whether to turn on or turn off multi-antenna receive diversity. The indicator may be calculated as:

$$\frac{F_1\left(\frac{E_{CT}}{E_{CP}}N\right)}{F_2(N)}$$

wherein, N represents the number of sectors in a soft handoff, $$\frac{E_{CT}}{E_{CP}}$$

represents an estimate of the energy-of-traffic to energy-of-pilot ratio, $F_1$ is a filter that filters the soft handoff weighted traffic-to-pilot ratio $$\frac{E_{CT}}{E_{CP}}N,$$

and $F_2$ is a filter that filters the number of sectors in a soft handoff to yield a long term average soft handoff size. Generally, $F_2$ has a longer time constant than $F_1$.

In another embodiment, the indicator may be calculated as:

$$\frac{F_1\left(\frac{N_T}{E_{CP}}*(\text{T\_adapt})*N\right)}{F_2(N)}$$

wherein, N represents the number of sectors in a soft handoff, $$\frac{N_T}{E_{CP}}*(\text{T\_adapt})*N$$

represents the estimate ratio of energy-of-noise to energy-of-pilot multiplied by the variables, T_adapt and N, $F_1$ is a filter that filters the soft handoff weighted traffic-to-pilot ratio $$\frac{N_T}{E_{CP}}*(\text{T\_adapt})*N,$$

and $F_2$ is a filter that filters the number of sectors in a soft handoff to yield a long term average soft handoff size. In one embodiment, filtering is performed by diversity control unit 270 illustrated in FIG. 2. Note, in a CDMA system, such as one supporting IS-95 or cdma2000, the number of sectors is directly communicated to the mobile station in handoff information messages. Each sector in the Active set is transmitting to the mobile station. The mobile station uses the handoff information to receive the various signals.

Network Capacity Limitations as Indicator(s) for Multi-antenna Receive Diversity:

One advantage of multi-antenna receive diversity is that it decreases the forward link power. However, at a certain point, a further decrease in forward link power does not increase capacity and quality of the system due to a limitation imposed by the modulation degrees of freedom in the system. In general, the number of degrees of freedom per second measures the number of orthogonal signals or bases a system may transmit every second. In cdma2000, the number of degrees of freedom for a channel is based on allocation of Walsh codes. Similarly, these techniques apply to other systems, which allocate orthogonal bases resources to users (e.g., orthogonal variable spreading codes for Wideband CDMA (WCDMA).

If the system is using resources to allocate orthogonal bases to mobiles (e.g., Walsh codes), then the orthogonal bases utilization may be a limitation of the capacity of the system. In one embodiment, the system uses the utilization of orthogonal bases to determine a threshold to turn off multi-antenna receive diversity. For example, in cdma2000, when the portion of the Walsh resource allocated from the network Walsh resource pool exceeds the portion of traffic energy, $E_{CT}$, allocated from the network power resource, multi-antenna receive diversity is turned off. Thus, for this embodiment, the Walsh utilization is used to adjust the target threshold of minimum forward link power to turn off multi-antenna receive diversity.

Quality Indicator(s) to Control Multi-antenna Receive Diversity:

In some embodiments, application of multi-antenna receive diversity control is based on quality of the traffic connection between a mobile and one or more base stations.

One quality indicator is the FER of a forward link traffic channel. When the number of errors passes a threshold within a certain time window, the multi-antenna receive diversity may be turned on for a specified amount of time or until the FER goes below an acceptable threshold. The control of multi-antenna receive diversity may be implemented dynamically to achieve a desired FER. Alternatively, the FER target may be fixed. When the target FER exceeds a threshold, multi-antenna receive diversity may be turned on. Any filtering, averaging, or smoothing method may be implemented to control application of multi-antenna receive diversity.

In one embodiment, application of multi-antenna receive diversity is based on a number of successive frame errors. For this embodiment, if the mobile detects a pre-determined number of successive frame errors, multi-antenna receive diversity is turned on. The predetermined number of frames may coincide with other thresholds set by the system. For example, if the system turns off the transmitter after a predetermined successive number of frame errors (e.g., 12 frames), the mobile may turn on multi-antenna receive diversity after a successive number of frame errors less than 12 (e.g., 6 frames) in an attempt to maintain the call. Alternatively, rather than considering successive frame errors, the short term FER may be used as an indicator. In this case a filter is applied with the individual frame errors as inputs, providing an estimate of the FER over the duration given by the filter time constant. If the FER exceeds a threshold, then multi-antenna receive diversity will be turned on.

Once multi-antenna receive diversity is turned on, due to an inadequate FER, it may be turned off by a variety of means. In one embodiment, multi-antenna receive diversity remains on for a period of time, after which multi-antenna receive diversity is turned off. In an alternate embodiment, multi-antenna receive diversity is turned off based on a given criteria, such as FER below a "turn off" threshold. Note, using an FER indicator for other channels may result in different threshold values, as each channel may have a different acceptable FER.

In some embodiments, control of multi-antenna receive diversity is based on the "state" of the connection between the mobile and one or more base stations. In some embodiments, multi-antenna receive diversity is turned on when the mobile is in an access state with a base station. Multi-antenna receive diversity is applied until the mobile is connected to the base station. In one implementation, the mobile uses the protocol state to determine if the mobile is connected with a base station.

Other quality indicators, such as symbol error rate, may be used to control application of multi-antenna receive diversity.

Figure 6:
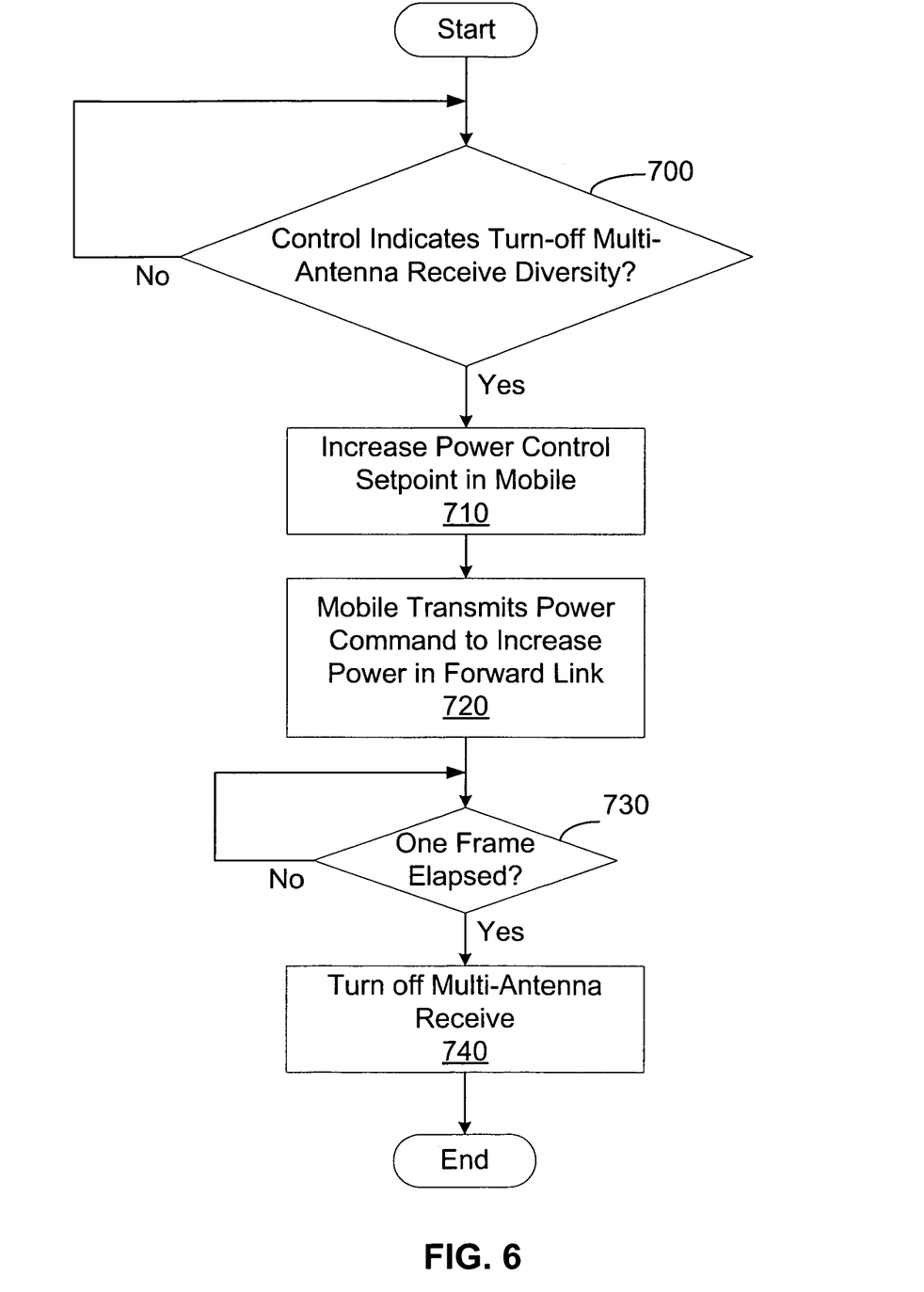
FIG. 6 is a flow diagram illustrating one embodiment for turning off multi-antenna receive diversity.

Turning Off Multi-antenna Receive Diversity:

When multi-antenna receive diversity is turned off, the amount of forward link power required at the mobile is increased. An abrupt turn off of multi-antenna receive diversity may result in degradation of the quality of the forward link. To maintain quality of service, in one embodiment, the system executes a procedure to turn off multi-antenna receive diversity. FIG. 6 is a flow diagram illustrating one embodiment for turning off multi-antenna receive diversity. For this embodiment, the setpoint for power control is adjusted prior to turning off multi-antenna receive diversity. Specifically, the power set point is increased in the mobile when the control indicates turning off multi-antenna receive diversity (blocks 700 and 710, FIG. 6). Specifically, for a turn-off decision, the power control setpoint in the MS is incremented at block 710. In turn, the mobile sends a control power command to the base station to increase power in the forward link (block 720, FIG. 6). As a result of the turn-up power command, the base station increases the forward link power, and multi-antenna receive diversity is subsequently turned off (blocks 730 and 740, FIG. 6). The method checks if one frame elapsed, block 730, and if so, turns off multi-antenna reception, block 740. When the mobile turns off multi-antenna receive diversity, the level of the forward link power is at an adequate level so that performance is not degraded, and the setpoint is restored to its previous value.

Procedure for Applying Multi-antenna Receive Diversity:

The multi-antenna receive diversity wireless system may use any one indicator, or a combination of one or more indicators, to decide whether to turn on or turn off multi-antenna receive diversity. For example, in one embodiment, the system selects the minimum of (1) the scaled ratio of energy-of-noise to energy-of-pilot or (2) the filtered ratio of energy-of-traffic to energy-of-pilot to turn off multi-antenna receive diversity. Each parameter potentially provides a threshold to turn off multi-antenna receive diversity. For example, the ratio of energy-of-traffic to energy-of-pilot measures power allocation from the perspective of the base station. If the base station will not substantially benefit from a decrease in forward link power, as indicated by the ratio of energy-of-noise to energy-of-pilot, then the advantage of operating multi-antenna receive diversity is reduced, and multi-antenna receive diversity is turned off.

Figure 7:
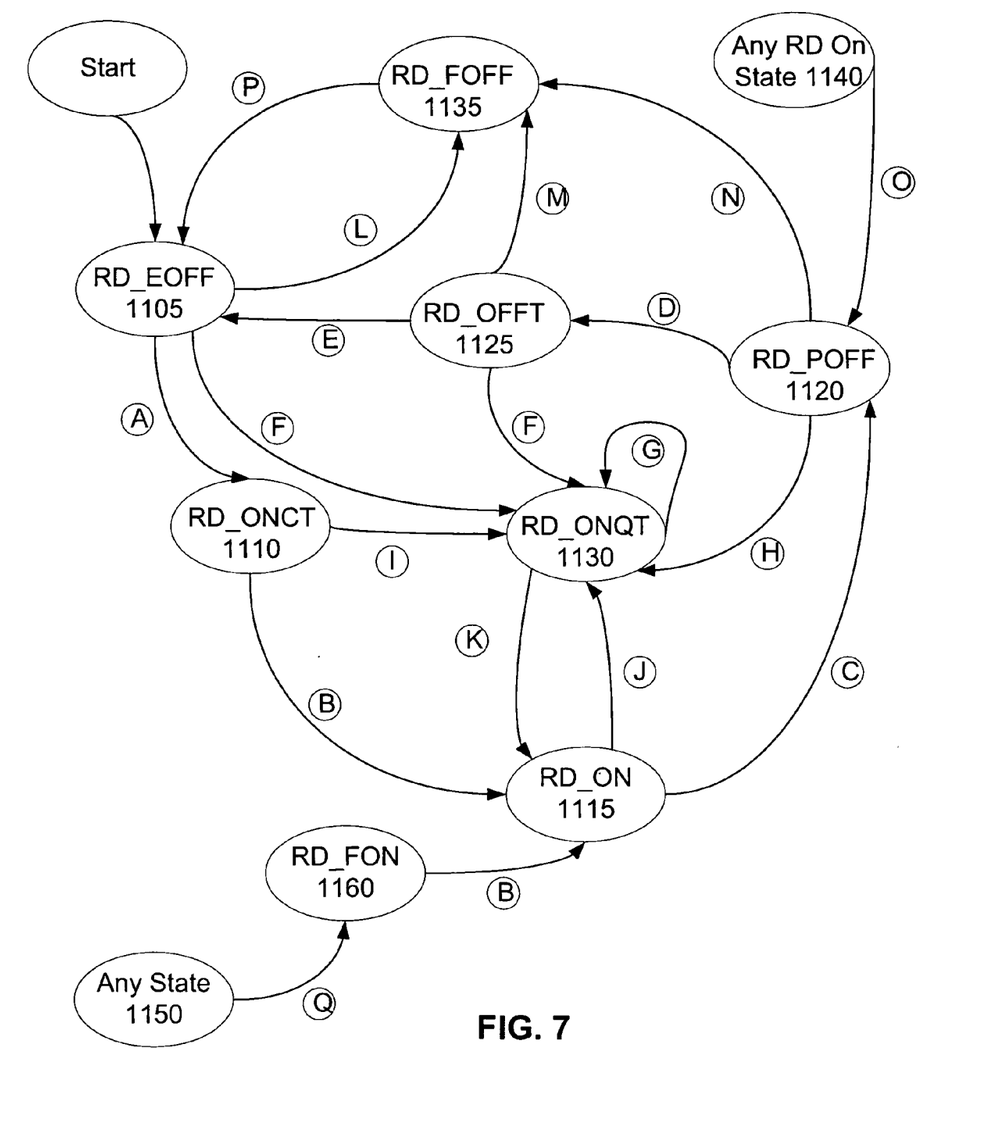
FIG. 7 illustrates a state diagram for one embodiment to dynamically control application of multi-antenna receive diversity.

FIG. 7 illustrates a state diagram for one embodiment to dynamically control application of multi-antenna receive diversity. In one embodiment, the state machine is clocked every 20 milliseconds (frame). The two primary conditions for operation of the state machine are capacity of the system and quality of the transmission. The state machine of FIG. 7 describes operation of multi-antenna receive diversity control for forward traffic estimates only. Multi-antenna receive diversity is on in the following states of FIG. 7: RD_ONCT 1110, RD_ONQT 1130, RD_FON 1160, RD_ON 1115. Multi-antenna receive diversity is off in the following remaining states: RD_POFF 1120, RD_FOFF 1135, RD_OFFT 1125, RD_EOFF 1105.

The initial state, at 1105, is referred to as multi-antenna receive diversity enabled off (RD_EOFF). If a test for network capacity is true (i.e., capacity metrics are greater than a threshold to turn on multi-antenna receive diversity) then the state machine transitions to the multi-antenna receive diversity on capacity timer state (RD_ONCT) at 1110 as indicated by transition arrow "A." In the multi-antenna receive diversity on capacity timer state 1110, multi-antenna receive diversity is turned on, and a capacity timer is set. If the capacity timer expires and a test for traffic quality is true (i.e., quality metrics are less than a threshold to turn on multi-antenna receive diversity) then the state machine transitions to the multi-antenna receive diversity on state (RD_ON) at 1115 (transition arrow "B").

In the multi-antenna receive diversity on state 1115, the control unit tests for capacity thresholds. If both the capacity and the quality tests do not motivate application of multi-antenna receive diversity, then the state machine transitions from the RD_ON state 1115 to a prepare to turn off multi-antenna receive diversity (RD_POFF) state (1120) (transition arrow "C"). The control unit, when in the RD_POFF state 1120, adjusts the forward power control setpoint. The state machine remains in the RD_POFF state 1120 for one state machine cycle (e.g., one frame). After one state machine cycle, if the quality test does not indicate application of multi-antenna receive diversity, then the state machine transitions from the RD_POFF state 1120 to a multi-antenna receive diversity off timer state (RD_OFFT) (1125) (transition arrow "D"). In entering the RD_OFFT state 1125, the control unit turns off multi-antenna receive diversity, returns the forward power control setpoint to the previous value, and starts a timer (e.g., short time duration).

From the RD_OFFT state 1125, if the timer expires and the quality test does not indicate application of multi-antenna receive diversity, then the state machine enters the multi-antenna receive diversity enabled off state (RD_EOFF) 1105 (transition arrow "E"). From either the RD_EOFF state 1105 or the RD_OFFT 1125 state, the state machine enters the multi-antenna receive diversity on quality timer (RD_ONQT) 1130 state if the quality test indicates application of multi-antenna receive diversity (transition arrow "F"). Under this scenario, the control unit turns on multi-antenna receive diversity and starts a quality timer of relatively long duration. The state machine also reenters the RD_ONQT state 1130 (i.e., from the RD_ONQT state) if the quality test indicates application of multi-antenna receive diversity (transition arrow "G"). For the reentry condition, the quality timer is reset. Also, the state machine enters the RD_ONQT state 1130, from the RD_POFF state 1120, if the quality test indicates application of multi-antenna receive diversity (transition arrow "H"). When entering the RD_ONQT 1130 state from the RD_POFF 1120 state, the control unit starts the quality timer, and returns the forward power control set point to the initial value. The state machine also enters the RD_ONQT state 1130 when multi-antenna receive diversity is turned on from RD_ONCT 1110 and RD_ON 1115 states (transition arrows "I" and "J", respectively). The RD_ONQT 1130 state is entered from the RD_ONCT 1110 and RD_ON 1115 states if the quality test indicates application of multi-antenna receive diversity. From these states, the control unit commences the quality timer. If the quality timer expires and the quality test does not indicate application of multi-antenna receive diversity, then the state machine transitions from the RD_ONQT 1130 state to the RD_ON 1115 state (transition arrow "K").

As shown in FIG. 7, a forced off command, from a multi-antenna receive diversity "off" state, results in a transition from the RD_EOFF 1105, RD_OFFT 1125 or RD_POFF 1120 states to the multi-antenna receive diversity forced off (RD_FOFF) 1135 state (transition arrows "L", "M", and "N"). For a forced off condition from an "off" state, multi-antenna receive diversity is disabled. A forced off command may be issued because the mobile device is not enabled for multi-antenna receive diversity or a hybrid mode is utilizing the receiver resources.

If multi-antenna receive diversity is in any "on" state, represented as Any RD On State 1140 in FIG. 7, the state machine transitions to the RD_POFF 1120 state in response to an off command (transition arrow "O"). In addition, the control unit adjusts the forward power control setpoint prior to turning off multi-antenna receive diversity. If a release forced off command is issued, the state machine transitions from the RD_FOFF state 1135 to the RD_EOFF state 1105 (transition arrow "P"). The system may also issue a force on command. If a force on command is issued, from any state, shown as 1150 in FIG. 7, the state machine transitions to the multi-antenna receive diversity forced on (RD_FON) state 1160 (transition arrow "Q"). If the system issues a release force on command, the state machine transitions from the RD_FON state 1160 to the RD_ON state 1115 (transition arrow "B").

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, state diagrams, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, state diagrams and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM) memory, flash memory, Read-Only Memory (ROM), Erasable Programmable ROM (EPROM), Electrically Erasable Programmable ROM (EEPROM) registers, hard disk, a removable disk, a Compact Disc Read-Only Memory (CD-ROM), or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless apparatus, comprising:
  a primary receiver;
  a second receiver, the second receiver adapted for multiple-antenna receive diversity in the wireless apparatus;
  a diversity controller coupled to the second receiver and adapted to enable and disable the second receiver, the diversity controller comprising:
    first estimator for estimating a capacity usage of the wireless apparatus;
    second estimator for estimating a load on network capacity; and control means for enabling the second receiver as a function of the estimated capacity usage of the wireless apparatus and the estimated load on network capacity,
wherein the estimated capacity usage of the wireless apparatus is given as $E_{CT}/I_{OR}$, wherein $I_{OR}$ represents the total energy per chip of all channels transmitting from a transmitter in the network, and $E_{CT}$ represents energy per chip of a traffic channel,
wherein the estimated load on network capacity is given as $I_{OR}/E_{CP}$, wherein $I_{OR}$ represents the total energy per chip for all channels transmitting from the transmitter in the network and $E_{CP}$ represents energy per chip of a pilot signal, and
wherein the control means is adapted to calculate a capacity estimate as:

$$\text{Capacity}_{Estimate}=I_{OR}/E_{CP}+E_{CT}/I_{OR};\text{ and}$$

wherein enabling the second receiver is a function of the capacity estimate.

2. The wireless apparatus as in claim 1, wherein the control means is further adapted calculate a weighted capacity estimate as:

$$\text{Capacity}_{Estimate}=\alpha_1 I_{OR}/E_{CP}+\alpha_2 E_{CT}/I_{OR};\text{ and}$$

wherein $\alpha_1$ and $\alpha_2$ are weight parameters corresponding to load on network capacity and capacity usage of the wireless apparatus, respectively, and
wherein enabling the second receiver is a function of the weighted capacity estimate.

3. The wireless apparatus as in claim 1, wherein the control means is further for disabling the second receiver as a function of the capacity estimate.

4. The wireless apparatus as in claim 1, wherein the second estimator is further adapted to estimate a total power allocation for the wireless apparatus and compare the estimated total power allocation for the wireless apparatus to a reference, wherein the control means enables the second receiver in response to the comparison.

5. The wireless apparatus as in claim 1, further comprising:
a timer initialized upon disabling the second receiver,
wherein upon expiration of the timer, the control means enables the second receiver.

6. A wireless apparatus, comprising:
a primary receiver;
a second receiver, the second receiver adapted for multiple-antenna receive diversity in the wireless apparatus;
a diversity controller coupled to the second receiver and adapted to enable and disable the second receiver, the diversity controller comprising:
 a first estimator for estimating a parameter of the wireless apparatus;
 a second estimator for estimating parameter of a network; and
control means for enabling the second receiver as a function of the estimated parameters,
wherein the diversity control unit is further adapted to:
 estimate a ratio of energy-of-traffic to energy-of-pilot;
 multiply the ratio by a number of sectors in soft handoff to generate an adjusted ratio;
 filter the adjusted ratio using a first time constant to generate a numerator;
 filter the number of sectors in soft handoff using a second time constant to generate a denominator; and
 generate an indicator dividing the numerator by the denominator; and
 use the indicator to control the second receiver.

7. The wireless apparatus as in claim 6, wherein:
the first estimator is adapted for estimating an energy-of-traffic;
the second estimator is adapted for estimating an energy-of-pilot; and
the control means is adapted for enabling the second receiver as a function of a ratio of the estimated energy-of-traffic to the estimated energy-of-pilot.

8. The wireless apparatus as in claim 7, wherein the ratio of the estimated energy-of-traffic to the estimated energy-of-pilot is calculated based on estimates from Power Control Bits (PCBs).

9. The wireless apparatus as in claim 8, wherein the ratio of the estimated energy-of-traffic to the estimated energy-of-pilot is estimated from a power control subchannel on a forward link.

10. The wireless apparatus as in claim 9, wherein the first estimator estimates a Power Control Bit magnitude of the power control subchannel and scales the mean magnitude to an equivalent energy magnitude.

11. The wireless apparatus as in claim 6, wherein:
the first estimator is adapted for estimating an energy-of-noise;
the second estimator is adapted for estimating an energy-of-pilot; and
the control means is adapted for enabling the second receiver as a function of a ratio of the estimated energy-of-noise to the estimated energy-of-pilot.

12. The wireless apparatus as in claim 11, wherein the control means is further for enabling the second receiver as a function of a scaled ratio of the estimated energy-of-noise to the estimated energy-of-pilot.

13. The wireless apparatus as in claim 12, wherein a scaling factor corresponds to a data rate of a traffic channel.

14. The wireless apparatus as in claim 13, wherein a scaling factor corresponds to setpoint from a power control outer loop.

15. The wireless apparatus as in claim 6, wherein the first estimator is adapted to calculate a frame error rate of a traffic channel.

16. A wireless apparatus, comprising:
primary receiver means;
secondary receiver means, the secondary receiver means adapted for multiple-antenna receive diversity in the wireless apparatus;
diversity controller means coupled to the secondary receiver means and comprising means for enabling and disabling the secondary receiver means, the diversity controller means comprising:
 means for estimating a capacity usage of the wireless apparatus;
 means for estimating a load on network capacity; and
 means for enabling the secondary receiver means as a function of the estimated capacity usage of the wireless apparatus and the estimated load on network capacity,
wherein the estimated capacity usage of the wireless apparatus is given as $E_{CT}/I_{OR}$, wherein $I_{OR}$ represents the total energy per chip of all channels transmitting from a transmitter in the network, and $E_{CT}$ represents energy per chip of a traffic channel,
wherein the estimated load on network capacity is given as $I_{OR}/E_{CP}$, wherein $I_{OR}$ represents the total energy per chip for all channels transmitting from the transmitter in the network and $E_{CP}$ represents energy per chip of a pilot signal, and wherein the control means includes means for calculating a capacity estimate as:

$$\text{Capacity}_{Estimate} = I_{OR}/E_{CP} + E_{CT}/I_{OR}; \text{ and}$$

wherein enabling the secondary receiver means is a function of the capacity estimate.

17. The wireless apparatus as in claim 16, wherein the means for enabling the secondary receiver means includes means for calculating a weighted capacity estimate as:

$$\text{Capacity}_{Estimate} = \alpha_1 I_{OR}/E_{CP} + \alpha_2 E_{CT}/I_{OR}; \text{ and}$$

wherein $\alpha_1$ and $\alpha_2$ are weight parameters corresponding to load on network capacity and capacity usage of the wireless apparatus, respectively, and wherein enabling the second receiver is a function of the weighted capacity estimate.

18. The wireless apparatus as in claim 16, wherein the means for enabling the secondary receiver means includes means for disabling the second receiver as a function of the capacity estimate.

19. The wireless apparatus as in claim 16, wherein the means for estimating the load on network capacity includes means for estimating a total power allocation for the wireless apparatus and means for comparing the estimated total power allocation for the wireless apparatus to a reference, wherein the means for enabling the secondary receiver means includes means for enabling the second receiver in response to the comparison.

20. The wireless apparatus as in claim 16, further comprising:
a timer initialized upon disabling the secondary receiver means,
wherein upon expiration of the timer, the means for enabling the secondary receiver means enables the secondary receiver means.

21. A wireless apparatus, comprising:
primary receiver means;
secondary receiver means, the secondary receiver means adapted for multiple-antenna receive diversity in the wireless apparatus;
diversity controller means coupled to the secondary receiver means and including means for enabling and disabling the secondary receiver means, the diversity controller means comprising:
means for estimating a parameter of the wireless apparatus;
means for estimating a parameter of the network;
means for enabling the secondary receiver means as a function of the estimated parameters;
means for estimating a ratio of energy-of-traffic to energy-of-pilot;
means for multiplying the ratio by a number of sectors in soft handoff to generate an adjusted ratio;
means for filtering the adjusted ratio using a first time constant to generate a numerator;
means for filtering the number of sectors in soft handoff using a second time constant to generate a denominator; and
means for generating an indicator dividing the numerator by the denominator; and
means for using the indicator to control the secondary receiver means.

22. The wireless apparatus as in claim 21, wherein:
the means for estimating the parameter of the wireless apparatus includes means for estimating an energy-of-traffic;
the means for estimating the parameter of the network includes means for estimating an energy-of-pilot; and
the means for enabling the secondary receiver means includes means for enabling the secondary receiver means as a function of a ratio of the estimated energy-of-traffic to the estimated energy-of-pilot.

23. The wireless apparatus as in claim 22, wherein the ratio of the estimated energy-of-traffic to the estimated energy-of-pilot is calculated based on estimates from Power Control Bits (PCBs).

24. The wireless apparatus as in claim 23, wherein the ratio of the estimated energy-of-traffic to the estimated energy-of-pilot is estimated from a power control subchannel on a forward link.

25. The wireless apparatus as in claim 24, wherein the means for estimating the parameter of the wireless apparatus estimates a Power Control Bit magnitude of the power control subchannel and scales the mean magnitude to an equivalent energy magnitude.

26. The wireless apparatus as in claim 21, wherein:
the means for estimating the parameter of the wireless apparatus includes means for estimating an energy-of-noise;
the means for estimating the parameter of the network includes means for estimating an energy-of-pilot; and
the means for enabling the secondary receiver means includes means for enabling the secondary receiver means as a function of a ratio of the estimated energy-of-noise to the estimated energy-of-pilot.

27. The wireless apparatus as in claim 26, wherein the means for enabling the secondary receiver means includes means for enabling the secondary receiver means as a function of a scaled ratio of the estimated energy-of-noise to the estimated energy-of-pilot.

28. The wireless apparatus as in claim 27, wherein a scaling factor corresponds to a data rate of a traffic channel.

29. The wireless apparatus as in claim 28, wherein a scaling factor corresponds to setpoint from a power control outer loop.

30. The wireless apparatus as in claim 21, wherein the means for estimating the parameter of the wireless apparatus includes means for calculating a frame error rate of a traffic channel.

31. A method comprising:
estimating a capacity usage of a wireless apparatus including a primary receiver and a secondary receiver, the secondary receiver adapted for multiple-antenna receive diversity in the wireless apparatus;
estimating a load on network capacity;
enabling the second receiver as a function of the estimated capacity usage of the wireless apparatus and the estimated load on network capacity,
wherein the estimated capacity usage of the wireless apparatus is given as $E_{CT}/I_{OR}$, wherein $I_{OR}$ represents the total energy per chip of all channels transmitting from a transmitter in the network, and $E_{CT}$ represents energy per chip of a traffic channel,
wherein the estimated load on network capacity is given as $I_{OR}/E_{CP}$, wherein $I_{OR}$ represents the total energy per chip for all channels transmitting from the transmitter in the network and $E_{CP}$ represents energy per chip of a pilot signal, and
wherein said enabling the second receiver includes:
calculating a capacity estimate as:

$$\text{Capacity}_{Estimate} = I_{OR}/E_{CP} + E_{CT}/I_{OR}; \text{ and}$$

enabling the second receiver as a function of the capacity estimate.

32. The method as in claim 31, wherein said enabling the second receiver includes calculating a weighted capacity estimate as:

$$\text{Capacity}_{Estimate}=\alpha_1 I_{OR}/E_{CP}+\alpha_2 E_{CT}/I_{OR},$$

wherein $\alpha_1$ and $\alpha_2$ are weight parameters corresponding to load on network capacity and capacity usage of the wireless apparatus, respectively; and enabling the second receiver as a function of the weighted capacity estimate.

33. The method as in claim 31, further comprising disabling the second receiver as a function of the capacity estimate.

34. The method as in claim 31, wherein said estimating the load on network capacity includes:
estimating a total power allocation for the wireless apparatus;
comparing the estimated total power allocation for the wireless apparatus to a reference; and
enabling the second receiver in response to the comparison.

35. The method as in claim 31, further comprising:
initializing a timer upon disabling the second receiver, and upon expiration of the timer, enabling the second receiver.

36. A method for estimating parameters of the wireless apparatus including primary receiver and a second receiver adapted for multiple-antenna receive diversity, comprising:
estimating a parameter of the network;
enabling the second receiver as a function of the estimated parameters;
estimating a ratio of energy-of-traffic to energy-of-pilot;
multiplying the ratio by a number of sectors in soft handoff to generate an adjusted ratio;
filtering the adjusted ratio using a first time constant to generate a numerator;
filtering the number of sectors in soft handoff using a second time constant to generate a denominator;
generating an indicator dividing the numerator by the denominator; and
using the indicator to control the second receiver.

37. The method as in 36, wherein:
estimating the parameter of the wireless apparatus includes estimating an energy-of-traffic;
estimating the parameter of the network includes estimating an energy-of-pilot; and
enabling the second receiver as a function of a ratio of the estimated energy-of-traffic to the estimated energy-of-pilot.

38. The method as in claim 37, wherein the ratio of the estimated energy-of-traffic to the estimated energy-of-pilot is calculated based on estimates from Power Control Bits (PCBs).

39. The method as in claim 38, wherein the ratio of the estimated energy-of-traffic to the estimated energy-of-pilot is estimated from a power control subchannel on a forward link.

40. The method as in claim 39, wherein estimating the parameter of the wireless apparatus comprises estimating a Power Control Bit magnitude of the power control subchannel and scaling the mean magnitude to an equivalent energy magnitude.

41. The method as in claim 36, wherein:
estimating the parameter of the wireless apparatus includes estimating an energy-of-noise;
estimating the parameter of the network includes estimating an energy-of-pilot; and
enabling the second receiver as a function of a ratio of the estimated energy-of-noise to the estimated energy-of-pilot.

42. The method as in claim 41, wherein said enabling the second receiver includes enabling the second receiver as a function of a scaled ratio of the estimated energy-of-noise to the estimated energy-of-pilot.

43. The method as in claim 42, wherein a scaling factor corresponds to a data rate of a traffic channel.

44. The method as in claim 43, wherein a scaling factor corresponds to setpoint from a power control outer loop.

45. The method as in claim 36, wherein said estimating the parameter of the wireless apparatus includes calculating a frame error rate of a traffic channel.

46. A computer executable program product having computer readable code stored in a computer-readable medium, comprising:
code for causing a computer to estimate a capacity usage of a wireless apparatus including a primary receiver and a secondary receiver, the secondary receiver adapted for multiple-antenna receive diversity in the wireless apparatus;
code for causing a computer to estimate a load on network capacity;
code for causing a computer to enable the second receiver as a function of the estimated capacity usage of the wireless apparatus and the estimated load on network capacity,
wherein the estimated capacity usage of the wireless apparatus is given as $E_{CT}/I_{OR}$, wherein $I_{OR}$ represents the total energy per chip of all channels transmitting from a transmitter in the network, and $E_{CT}$ represents energy per chip of a traffic channel,
wherein the estimated load on network capacity is given as $I_{OR}/E_{CP}$, wherein $I_{OR}$ represents the total energy per chip for all channels transmitting from the transmitter in the network and $E_{CP}$ represents energy per chip of a pilot signal, and
wherein the code for causing a computer to enable the second receiver includes:
code for causing a computer to calculate a capacity estimate as:

$$\text{Capacity}_{Estimate}=I_{OR}/E_{CP}+E_{CT}/I_{OR}; \text{ and}$$

code for causing a computer to enable the second receiver as a function of the capacity estimate.

47. The computer program product as in claim 46, wherein the code for causing a computer to enable the second receiver includes code for causing a computer to calculate a weighted capacity estimate as:

$$\text{Capacity}_{Estimate}=\alpha_1 I_{OR}/E_{CP}+\alpha_2 E_{CT}/I_{OR},$$

wherein $\alpha_1$ and $\alpha_2$ are weight parameters corresponding to load on network capacity and capacity usage of the wireless apparatus, respectively; and
code for causing a computer to enable the second receiver as a function of the weighted capacity estimate.

48. The computer program product as in claim 46, further comprising:
code for causing a computer to disable the second receiver as a function of the capacity estimate.

49. The computer program product as in claim 46, wherein the code for causing a computer to estimate the load on network capacity includes:
code for causing a computer to estimate a total power allocation for the wireless apparatus;

code for causing a computer to compare the estimated total power allocation for the wireless apparatus to a reference; and code for causing a computer to enable the second receiver in response to the comparison.

50. The computer program product as in claim 46, further comprising:

code for causing a computer to initialize a timer upon disabling the second receiver, and code for causing a computer to enable the second receiver upon expiration of the timer.

51. A computer executable program product having computer readable code stored in a computer-readable medium, comprising:

code for causing a computer to estimate a parameter of the wireless apparatus;

code for causing a computer to estimate a parameter of the network;

code for causing a computer to enable the second receiver as a function of the estimated parameters;

code for causing a computer to estimate a ratio of energy-of-traffic to energy-of-pilot;

code for causing a computer to multiply the ratio by a number of sectors in soft handoff to generate an adjusted ratio;

code for causing a computer to filter the adjusted ratio using a first time constant to generate a numerator;

code for causing a computer to filter the number of sectors in soft handoff using a second time constant to generate a denominator;

code for causing a computer to generate an indicator dividing the numerator by the denominator; and code for causing a computer to use the indicator to control the second receiver.

52. The computer program product as in claim 51, wherein:

the code for causing the computer to estimate the parameter of the wireless apparatus includes code for causing a computer to estimate an energy-of-traffic, and the code for causing a computer to estimate the parameter of the network includes code for causing a computer to estimate an energy-of-pilot; and further comprising code for causing a computer to enable the second receiver as a function of a ratio of the estimated energy-of-traffic to the estimated energy-of-pilot.

53. The computer program product as in claim 52, wherein the ratio of the estimated energy-of-traffic to the estimated energy-of-pilot is calculated based on estimates from Power Control Bits (PCBs).

54. The computer program product as in claim 53, wherein the ratio of the estimated energy-of-traffic to the estimated energy-of-pilot is estimated from a power control subchannel on a forward link.

55. The computer program product as in claim 54, wherein the code for causing a computer to estimate the parameter of the wireless apparatus comprises code for causing a computer to estimate a Power Control Bit magnitude of the power control subchannel and scaling the mean magnitude to an equivalent energy magnitude.

56. The computer program product as in claim 51, wherein:

the code for causing a computer to estimate the parameter of the wireless apparatus includes code for causing a computer to estimate an energy-of-noise, and code for causing a computer to estimate the parameter of the network includes code for causing a computer to estimate an energy-of-pilot; and further comprising code for causing a computer to enable the second receiver as a function of a ratio of the estimated energy-of-noise to the estimated energy-of-pilot.

57. The computer program product as in claim 56, wherein the code for causing a computer to enable the second receiver includes code for causing a computer to enable the second receiver as a function of a scaled ratio of the estimated energy-of-noise to the estimated energy-of-pilot.

58. The computer program product as in claim 57, wherein a scaling factor corresponds to a data rate of a traffic channel.

59. The computer program product as in claim 58, wherein a scaling factor corresponds to setpoint from a power control outer loop.

60. The computer program product as in claim 51, wherein the code for causing a computer to estimate the parameter of the wireless apparatus includes code for causing a computer to calculate a frame error rate of a traffic channel.

* * * * *